United States Patent [19]
Denis

[11] Patent Number: 6,032,777
[45] Date of Patent: Mar. 7, 2000

[54] LOCKING DEVICE, IN PARTICULAR FOR A MOTOR VEHICLE SEAT

[75] Inventor: Christophe Denis, Athis de L'orne, France

[73] Assignee: Bertrand Faure Equipements S.A, Boulogne, France

[21] Appl. No.: 09/124,467

[22] Filed: Jul. 29, 1998

[30] Foreign Application Priority Data

Jul. 30, 1997 [FR] France ................................ 97 09707

[51] Int. Cl.$^7$ ...................................... B60N 2/22
[52] U.S. Cl. ..................... 192/223.2; 297/361.1; 297/374
[58] Field of Search ............... 192/223, 223.2; 297/361.1, 374, 463.1; 74/531

[56] References Cited

U.S. PATENT DOCUMENTS

| | | | |
|---|---|---|---|
| 1,529,248 | 3/1925 | Greene et al. .................... | 192/223.2 |
| 4,262,782 | 4/1981 | Kouth .................................. | 192/223 |
| 5,248,017 | 9/1993 | Schwarzbich ..................... | 192/223.2 |
| 5,522,488 | 6/1996 | Schwarxbich ..................... | 192/223.2 |
| 5,593,210 | 1/1997 | Schwarzbich ..................... | 297/361.1 |
| 5,794,479 | 8/1998 | Schwarxbich ..................... | 192/223.2 |
| 5,896,973 | 4/1999 | Hochmuth et al. ................ | 192/223.2 |

FOREIGN PATENT DOCUMENTS

| | | |
|---|---|---|
| 843 668 | 7/1939 | France . |
| 37 34363 | 4/1989 | Germany . |

OTHER PUBLICATIONS

French Preliminary Search Report dated Apr. 8, 1998, French Application FR 9709707.

*Primary Examiner*—Richard M. Lorence
*Attorney, Agent, or Firm*—Marshall, O'Toole, Gerstein, Murray & Borun

[57] ABSTRACT

The invention relates to a locking device comprising a support plate, an annulus in contact with the support plate, a rotary cam housed inside the annulus, a rotary control member, and wheels mounted to move in running paths defined by the cam and the annulus and suitable for preventing the cam from moving in the absence of action taken on the control member. The device further comprises a closure ring having tabs which are secured to the support plate. The annulus, the support plate, and the closure ring are superposed on one another to form a closed housing in which the annulus is prevented from rotating.

8 Claims, 1 Drawing Sheet

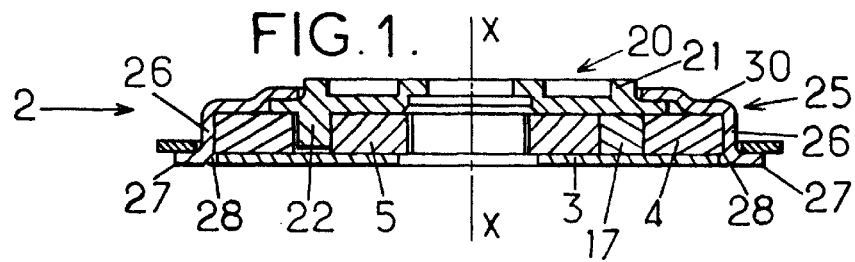
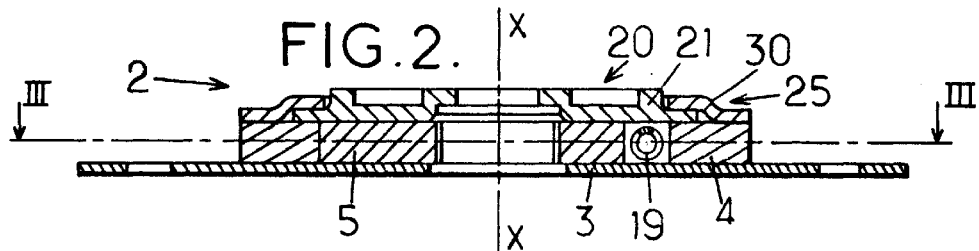
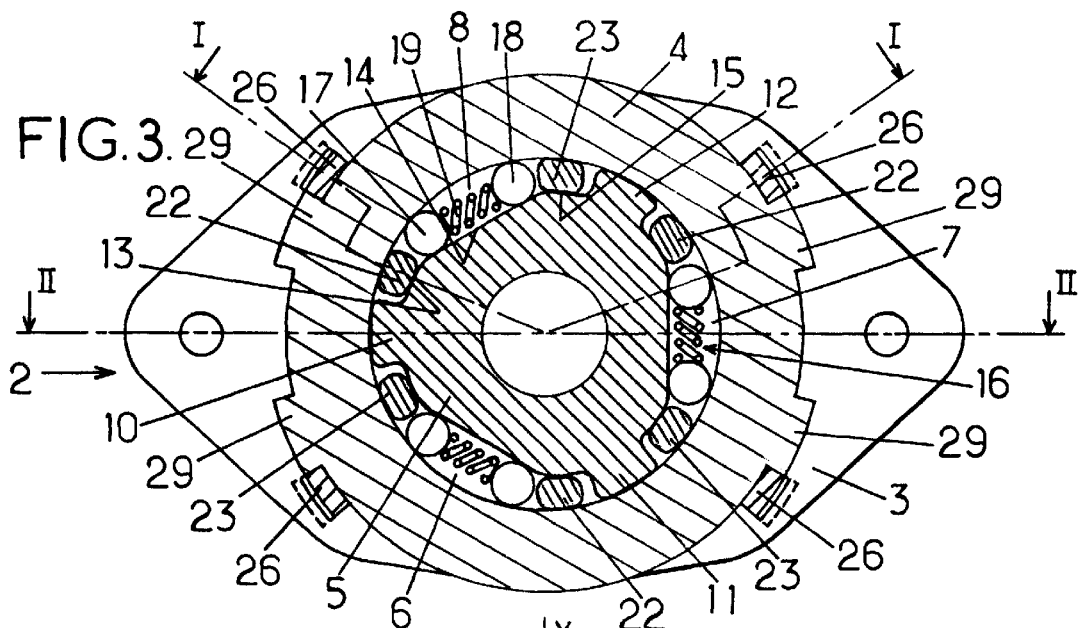
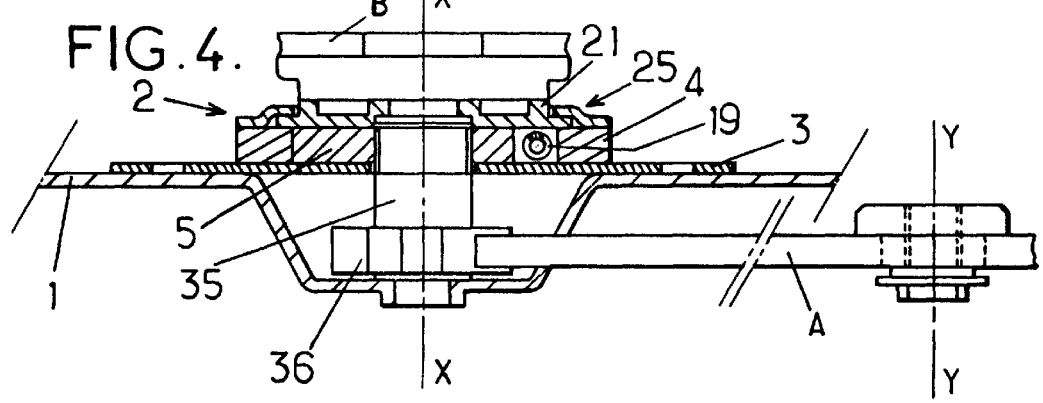

6,032,777

LOCKING DEVICE, IN PARTICULAR FOR A MOTOR VEHICLE SEAT

The present invention relates to a locking device, e.g. mounted on a motor vehicle seat and of the type commonly referred to as an "auto-lock" device.

BACKGROUND OF THE INVENTION

As a general rule, devices of this type comprise:

a support plate;

an annulus in contact with the support plate;

a cam housed to rotate in the annulus about a central axis and designed to be mounted to rotate with an outlet member, the cam and the annulus defining at least one running path of varying section;

control member mounted to rotate relative to the support plate about the central axis;

locking means mounted to move in the running path, said locking means being normally in a locked state in which they co-operate with the annulus and the cam to prevent any relative rotary movement of said cam relative to the support plate in the absence of the control member being actuated, said control member being adapted to act on the locking means by placing them in an unlocking state in which they allow the cam to rotate relative to the support plate; and a closure ring partially defining a housing which encloses the cam and the locking means, said closure ring being fixed to the support plate.

Such devices are used in particular for varying the position adjustment of a motor vehicle seat comprising a seat proper which is mounted on a lift device and/or which rotatably supports a seat back. The support plate is generally fixed to the seat back and the control member is driven in rotation by a control knob actuated by a user of the seat.

In the most common applications of locking devices of the above type, the cam is connected either to the seat back or to a lift mechanism.

By means of such devices, the user can vary the height of the seat or the inclination of the seat back while being assured that the seat and the seat back will remain in the desired position after adjustment.

Known locking mechanisms of the above-mentioned type are manufactured in two stages, insofar as it is necessary firstly to make the housing containing the device and then to connect the housing to the support plate. That type of assembly is expensive and increases overall size.

OBJECTS AND SUMMARY OF THE INVENTION

An object of the present invention is to remedy the above-mentioned drawbacks by providing a simplified locking mechanism.

To this end, according to the invention, in the locking device of the above-specified type the closure ring is in the form of a simple plate which covers axially at least the annulus on its side remote from the support plate and which extends axially towards said support plate via tabs holding the annulus captive, said tabs being secured to the support plate, and the annulus resting directly against said support plate.

In this way, the device of the invention no longer has a case proper forming a housing to which it is necessary to rivet a backing plate. The closure ring holds together the component elements of the device and is fixed directly to a support plate which acts as a backing plate. In this way, assembly operations are made easier and the thickness of the assembly is decreased.

The locking device of the invention may optionally include one or more of the following characteristics:

the tabs of the closure ring have free ends and the support plate has holes in register with the free ends, said free ends passing through the holes and being folded back so as to fix the closure ring to the support plate;

the closure ring includes at least two tabs and the annulus has at least two external studs co-operating with said tabs to prevent the annulus from rotating relative to the support plate;

the locking means comprise at least one pair of wheels housed in said running path, said running path having two ends of wedge shape co-operating with respective ones of the wheels to lock the cam in the absence of action on the control member;

the wheels of the pair of wheels are held apart by a resilient member;

the control member comprises a cheek plate mounted to rotate with lost motion relative to the cam and which is provided with at least one pair of fingers projecting into the running path, said two fingers being adapted to push against respective ones of the wheels in the running path to compress the resilient member when the control member is actuated, thereby enabling the cam to rotate relative to the support plate;

the control member has two fingers projecting into the running path, on either side of the pair of wheels, one of the fingers pushing against one of the wheels and releasing the cam to rotate relative to the support plate, and the other finger rotating the cam relative to the support plate when the control member is actuated; and the closure ring is made of cutout and stamped sheet metal.

BRIEF DESCRIPTION OF THE DRAWINGS

An embodiment of the invention is described below with reference to the accompanying drawings, in which:

FIGS. 1 and 2 are cross-section views of the locking device respectively on lines I—I and II—II of FIG. 3;

FIG. 3 is a section view on line III—III of FIG. 2; and

FIG. 4 is a cross-section view through the locking device shown in FIGS. 1 to 3 and integrated in a lift mechanism for a motor vehicle seat.

MORE DETAILED DESCRIPTION

The locking device of the present invention is designed to be integrated in a motor vehicle seat of which only a portion of the structure of the seat proper 1 is shown in FIG. 4, e.g. for the purpose of preventing any movement of a lift device for lifting the seat proper of the motor vehicle unless a user of the seat acts on a control knob B of the lift device.

The locking device 2 comprises a support plate 3 designed to be fixed to the structure of the seat proper 1, which structure carries, for example, a lift rod A belonging to the lift device;

an annulus 4 which is placed directly on the support plate 3; and a cam 5 also carried by the support plate 3 and rotatably received in the annulus 4.

The cam has the same axis of rotation X—X as the annulus 4 and is generally annular in shape having a diameter equal to the inside diameter of the annulus. At the periphery of the cam 5, there are formed three recesses co-operating with the annulus 4 to define three running paths 6, 7, and 8. These three recesses are separated from one another by three tabs 10, 11, and 12 which are tangential to the inside diameter of the annulus 4.

In addition, the outline of the cam between these three tabs is defined by circular arcs having different radii of curvature. In the vicinity of each tab, the circular arcs have radii of curvature substantially equal to the radius of curvature of the annulus 4, while the circular arc interconnecting the above two circular arcs has a radius of curvature that is much larger. Each running path 6 to 8 thus has three segments 13 to 15 of different section: two end segments 13 and 15 in the vicinity of the tabs 10 to 12 which are identical in section, and a central section 14 of section that is larger than the two preceding sections.

In addition, the locking device 2 has locking means 16 designed to prevent any relative rotary movement of the cam 5 relative to the annulus 4, and constituted by three pairs of wheels 17, 18. In any given pair, the two wheels 17 and 18 are held resiliently apart from each other by a spring 19. Each of these pairs of wheels is received in a respective one of the three running paths 6 to 8, and more particularly it is received in the vicinity of the segment 14 of each such path.

In addition, the locking device 2 has a control member 20 designed to rotate the cam 5 relative to the annulus 4 and comprising a cheek plate 21. The cheek plate extends over the annulus and the cam, and has three pairs of fingers 22 and 23 which project into each of the three running paths 6 to 8, and more particularly projects into them in the vicinity of the segments 13 and 15. The cheek plate 21 is also secured to the control knob B that is designed to be actuated by the user of the seat.

Finally, the locking device 2 has a closure ring 25 fitted to the cheek plate 21 and to the annulus 4. This closure ring is in the form of a piece of metal sheet that is cut out and stamped, having four tabs 26 extending along the outside surface of the annulus 4 towards the support plate 3. Each tab 26 has a free end 27 passing through a hole 28 formed in register therewith in the support plate 3. After passing through the hole 28, the free end 27 is folded beneath the support plate 3.

In addition, at its periphery, the annulus 4 has four external studs 29 which are adjacent to respective tabs 26 of the closure ring 25. The annulus 4 is thus prevented from rotating relative to the support plate 3 by the closure ring 25.

The cheek plate 21, the closure ring 25, the annulus 4, and the support plate 3 thus form a housing in which the cam 3 and the pairs of wheels 17 and 18 are held captive. Nevertheless, the cheek plate 21 is free to rotate relative to the annulus 4 insofar as it is merely sandwiched between the closure ring 25 and the annulus 4. This is made easier by the fact that the outside diameter of the cheek plate 21 is smaller than the outside diameter of the annulus 4, and the closure ring 25 has a shoulder 30 such that the surface of said closure ring 25 is pressed simultaneously against the cheek plate 21 and the annulus 4.

The support plate 3 and the cam 5 have a bore passing through them enabling a shaft 35 or an outlet member to be mounted that is constrained to rotate with the cam 5. A gearwheel 36 is fixed to the end of the shaft 35 for the purpose of co-operating with the lift rod A which is itself mounted to rotate about an axis of rotation Y—Y.

The operation of the device is described below with reference to FIGS. 3 and 4.

So long as the user does not act on the control knob B, the locking device is in its rest position. Each wheel 17 and 18 of the pairs of wheels housed in each of the running paths 6, 7, and 8 is then urged by the associated spring 19 to be jammed substantially in the transition zone between the segments 13 and 14 or the segments 14 and 15 as the case may be. The wheels then provide a wedging effect which prevents the cam 5 from moving relative to the annulus 4 both clockwise and counterclockwise. Since the cam 5 is thus prevented from rotating, the gearwheel 36 is also prevented from rotating, thereby preventing the rod A of the lift device from moving.

When the user of the seat desires to adjust the vertical position of the seat proper 1, the user acts on the control knob B, e.g. turning it clockwise. This rotation rotates the cheek plate 21 clockwise together with the fingers 22 and 23 which are secured thereto. The three fingers 22 then push back the three wheels 17 against the force exerted by the corresponding spring 19, thereby releasing rotary movement in the clockwise direction for the cam 5 relative to the annulus 4. It will be understood that at this point that movements of the fingers 22 and 23 in each of the running paths 6, 7, and 8 is possible insofar as the spacing between the fingers 22 and 23 in any of the running paths is slightly smaller than the total length of the corresponding path. During the rotary movement, the fingers 23 come into abutment against the tabs 10, 11, and 12 of the cam, thereby rotating the cam 5 when the user continues to turn the knob B in the same direction of rotation.

Rotation of the cam 5 causes the shaft 35 to rotate and therefore rotates the gearwheel 36. The gearwheel rotates the lift rod A, thereby enabling the seat to be lifted by a downstream device (not shown).

When, on the contrary, the user desires to lower the seat, then the user turns the control knob B counterclockwise. The fingers 22 now exert the action that was exerted by the fingers 23 in the preceding movement. Specifically, the fingers 23 push back the wheels 18 while the fingers 22 come into abutment against the tabs 10, 11, and 12 of the cam 5. The cam then rotates in the counterclockwise direction allowing the rod A to be driven in the direction for lowering the seat.

The device of the invention thus acts as an "auto-lock" type device while being more compact because its housing has a small number of parts and can be secured directly to the structure of the seat proper 1.

What is claimed is:

1. A locking device comprising:

a support plate;

an annulus in contact with the support plate;

a cam housed to rotate in the annulus about a central axis and designed to be mounted to rotate with an outlet member, the cam and the annulus defining at least one running path of varying section;

a control member mounted to rotate relative to the support plate about the central axis;

locking means mounted to move in the running path, said locking means being normally in a locked state in which they co-operate with the annulus and the cam to prevent any relative rotary movement of said cam relative to the support plate in the absence of the control member being actuated, said control member being adapted to act on the locking means by placing them in an unlocking state in which they allow the cam to rotate relative to the support plate; and a closure ring partially defining a housing which encloses the cam and the locking means, said closure ring being fixed to the support plate, wherein the closure ring is in the form of a simple plate which covers axially at least the annulus on its side remote from the support plate and which extends axially towards said support plate via tabs holding the annulus captive, said tabs being secured to the support plate, and the annulus resting directly against said support plate.

2. A locking device according to claim 1, in which the tabs of the closure ring have free ends and the support plate has holes in register with the free ends, said free ends passing through the holes and being folded back so as to fix the closure ring to the support plate.

3. A locking device according to claim 1, in which the closure ring includes at least two tabs and the annulus has at least two external studs co-operating with said tabs to prevent the annulus from rotating relative to the support plate.

4. A locking device according to claim 1, in which the locking means comprise at least one pair of wheels housed in said running path, said running path having two ends of wedge shape co-operating with respective ones of the wheels to lock the cam in the absence of action on the control member.

5. A locking device according to claim 4, in which the wheels of the pair of wheels are held apart by a resilient member.

6. A locking device according to claim 4, in which the control member comprises a cheek plate mounted to rotate with lost motion relative to the cam and which is provided with at least one pair of fingers projecting into the running path, said two fingers being adapted to push against respective ones of the wheels in the running path to compress the resilient member when the control member is actuated, thereby enabling the cam to rotate relative to the support plate.

7. A locking device according to claim 6, in which the control member has two fingers projecting into the running path, on either side of the pair of wheels, one of the fingers pushing against one of the wheels and releasing the cam to rotate relative to the support plate, and the other finger rotating the cam relative to the support plate when the control member is actuated.

8. A locking device according to claim 7, in which the closure ring is made of cutout and stamped sheet metal.

* * * * *